(12) United States Patent
Rossi et al.

(10) Patent No.: US 7,609,973 B2
(45) Date of Patent: Oct. 27, 2009

(54) ELECTRO-OPTICAL COMMUNICATION SYSTEM

(75) Inventors: Giammarco Rossi, Stradella (IT); Luigi Gastaldi, Fiano (IT); Piero Gambini, Turin (IT)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 536 days.

(21) Appl. No.: 10/918,155

(22) Filed: Aug. 13, 2004

(65) Prior Publication Data

US 2005/0063711 A1 Mar. 24, 2005

(30) Foreign Application Priority Data

Sep. 20, 2003 (GB) ................................. 0322055.5

(51) Int. Cl.
*H04B 10/00* (2006.01)

(52) U.S. Cl. .................. 398/135; 398/136; 398/137; 398/138; 398/25; 398/140; 398/158; 398/162; 398/192; 398/195

(58) Field of Classification Search ......... 398/135–139, 398/25, 140, 158, 162, 192, 195; 372/34, 372/219; 385/88
See application file for complete search history.

(56) References Cited

U.S. PATENT DOCUMENTS

| | | | | |
|---|---|---|---|---|
| 6,055,252 A * | 4/2000 | Zhang | .......................... | 372/34 |
| 6,337,886 B1 | 1/2002 | Asahi | .......................... | 375/316 |
| 6,563,623 B1 | 5/2003 | Penninckx et al. | .......... | 359/183 |
| 6,975,642 B2 * | 12/2005 | Levinson et al. | ............ | 370/445 |
| 2001/0046076 A1 | 11/2001 | Kim et al. | .................... | 359/124 |
| 2002/0181894 A1 * | 12/2002 | Gilliland et al. | ............... | 385/88 |
| 2003/0002108 A1 * | 1/2003 | Ames et al. | ................. | 359/152 |
| 2003/0048512 A1 * | 3/2003 | Ota | ............................ | 359/152 |
| 2003/0103772 A1 | 6/2003 | Ishi et al. | .................... | 398/197 |
| 2003/0128411 A1 * | 7/2003 | Aronson et al. | ............. | 359/152 |
| 2003/0156841 A1 * | 8/2003 | Chraplyvy et al. | ........... | 398/79 |
| 2003/0165168 A1 | 9/2003 | Murata | | |
| 2004/0022543 A1 * | 2/2004 | Hosking et al. | ............. | 398/135 |
| 2004/0022544 A1 * | 2/2004 | Case et al. | .................. | 398/137 |
| 2004/0033079 A1 * | 2/2004 | Sheth et al. | ................. | 398/135 |
| 2004/0067061 A1 * | 4/2004 | Jiang et al. | .................. | 398/135 |

(Continued)

FOREIGN PATENT DOCUMENTS

EP 0 539 038 4/1993

(Continued)

OTHER PUBLICATIONS

Abe et al: "Short Wave SFF Small Form Factor Transceivers", 2001 Electronic Components and Technology Conference.*

*Primary Examiner*—Ken N Vanderpuye
*Assistant Examiner*—Li Liu

(57) ABSTRACT

There is provided an opto-electronic communication system. The opto-electronic communication system has (a) a transmitter module including an electro-optical source for converting an electrical input signal into an optical output signal, (b) a receiver module including an opto-electrical detector for converting an optical input signal into an electrical output signal, (c) a sensor for sensing a bit rate of the optical input signal, (d) an adaptation unit associated with the transmitter module for varying an operation parameter of the transmitter module, and (e) a processing unit for determining a desired operating parameter of the transmitter module based on the bit rate, and for controlling operation of the adaptation unit in order to adapt operation of the transmitter module in accordance with the desired operating parameter.

8 Claims, 1 Drawing Sheet

U.S. PATENT DOCUMENTS

| | | | |
|---|---|---|---|
| 2004/0091028 A1* | 5/2004 | Aronson et al. | 375/219 |
| 2005/0031352 A1* | 2/2005 | Light et al. | 398/135 |
| 2005/0095007 A1* | 5/2005 | Odate et al. | 398/159 |
| 2005/0213982 A1* | 9/2005 | Weber | 398/135 |
| 2006/0034612 A1* | 2/2006 | Yu et al. | 398/135 |
| 2007/0031153 A1* | 2/2007 | Aronson et al. | 398/138 |

FOREIGN PATENT DOCUMENTS

| | | |
|---|---|---|
| EP | 0 543 570 | 5/1993 |
| EP | 1 134 925 | 9/2001 |
| EP | 1 187 373 | 3/2002 |
| WO | WO 99/53577 | 10/1999 |
| WO | WO 02/071670 | 9/2002 |
| WO | WO 03/023917 | 3/2003 |

* cited by examiner

US 7,609,973 B2

ELECTRO-OPTICAL COMMUNICATION SYSTEM

FIELD OF THE INVENTION

The present invention relates to electro-optical communication systems of the kind including at least one of a transmitter module and a receiver module. A typical example of such a system is a so-called "transceiver" i.e. a system including both a transmitter module and a receiver module.

DISCUSSION OF THE BACKGROUND ART

Increasing integration of modern communication networks imposes on apparatus strong requirements in terms of the ability to support different protocols and data rates. Flexibility is a key factor to more cost efficient networking.

Within this framework, data "agnostic" transceivers have been proposed like those described by the so-called XFP MSA Group, XFP and MSA being acronyms for Small Form Factor Pluggable and Multi Source Agreement, respectively.

Specifically, the goal of the XFP MSA Group is to create a specification for a module, cage hardware, and IC interfaces for a 10 Gbit hot pluggable module converting serial electrical signals to external serial optical or electrical signals. The technology is intended to be flexible enough to support OC192/STM-64, 10 G Fibre Channel, G.709, and 10 G Ethernet, usually with the same module. The module design and the volume of production are expected to enable very low cost 10 G solutions.

The modules in question contain clock and data recovery circuits (CDRs) that are able to work at different data rates around 10 Gbit/s. In fact, different standards imply different data rates, namely 9.953 GHz for SONET/SDH, 10.312 GHz for 10 GbE, 10.5 GHz for Fiber Channel (FC), 10.7 GHz for FEC SONET/SDH and 11.1 GHz for FEC 10 GbE.

The acronyms referred to in the foregoing are well known to those of skill in the art, thus making it unnecessary to provide a detailed explanation herein.

These different standards imply different data rates as well as different specifications for optical and electrical receiver and transmitter characteristics, i.e. extinction ratio, power launched, receiver sensitivity. The extinction ratio (ER) is defined as the ratio of two optical power levels $P_1$ and $P_2$ of a digital signal generated by an optical source, e.g., a laser diode, where $P_1$ is the optical power level generated when the light source is "on", and $P_2$ is the power level generated when the light source is "off".

As a consequence, in addition to being capable of detecting and tuning to the proper data rate, a transceiver adapted for multi-standard operation must also be capable of complying with the other varying requirements of the standards involved.

This requirement may be a severe one, especially for e.g. transmitter modules using a direct modulated laser (DML) as the transmitting source. In fact, standards like 10 GbE and FC work at higher bit rates but allow lower ERs, while SONET works at a lower bit rate but requires a higher ER.

The bandwidth of a DML is higher at higher currents, while the ER is lower (when keeping the modulation current constant). Consequently, a DML based transmitter can be adjusted to meet either of the specifications/standards considered in the foregoing by changing the bias current.

At present, adjustment to a certain standard is performed mostly at the factory level: once a certain set up is chosen and implemented, this is fixed and cannot be modified by the user. In order to comply with different standards, the module has to meet a subset of specifications that are compatible with all the supported standards. Of course, this is more difficult to achieve than meeting a single set of specifications and both the product yield and eventually the module price may be adversely affected by the desire to comply with such a requirement.

The need is therefore felt for electro-optical communication systems of the kind considered in the foregoing that may easily adapt themselves to different standards thereby ensuring truly multi-standard operation.

SUMMARY OF THE INVENTION

The object of the present invention is to provide a system fully satisfying that need. According to the present invention, that object is achieved by means of a system having the features set forth in the claims that follow.

Preferred exemplary embodiments of the invention include transmitter/receiver arrangements wherein e.g. the average output power of the transmitter can be adaptively varied by acting on the mean average power control loop, while other factors such as the relationship between the bias and modulation currents or the bandwidth value for the used bit rate can be selectively adapted to the requirements of various standards of operation. Advantageously, this customization ability can be extended to meet some customer specific requirements.

A preferred embodiment of the invention includes an on-board or off-board processing unit (such as e.g. a microprocessor or an application specific integrated circuit) or any other digital or analog circuit capable of varying the parameters involved in the processing of adapting the systems to different standards of operation, adaptation being also possible "on the fly".

The standard involved can be detected e.g. by examining the data rate of an incoming signal: a detector will measure the data rate (clock frequency) and output a digital or analog value used by the processing unit in order to change the related parameters. The desired standard may also be communicated to the module by a host board through a management interface. The processing unit can then change the system parameters in order to meet the desired standard.

BRIEF DESCRIPTION OF THE DRAWINGS

The invention will now be described, by way of example only, with reference to the annexed FIGURE of drawing: this is a block diagram of an electro-optical transceiver whose operational parameters can be selectively adapted to different, currently used communication standards such as those mentioned in the foregoing.

DETAILED DESCRIPTION OF THE PREFERRED EMBODIMENT

Figure 1:
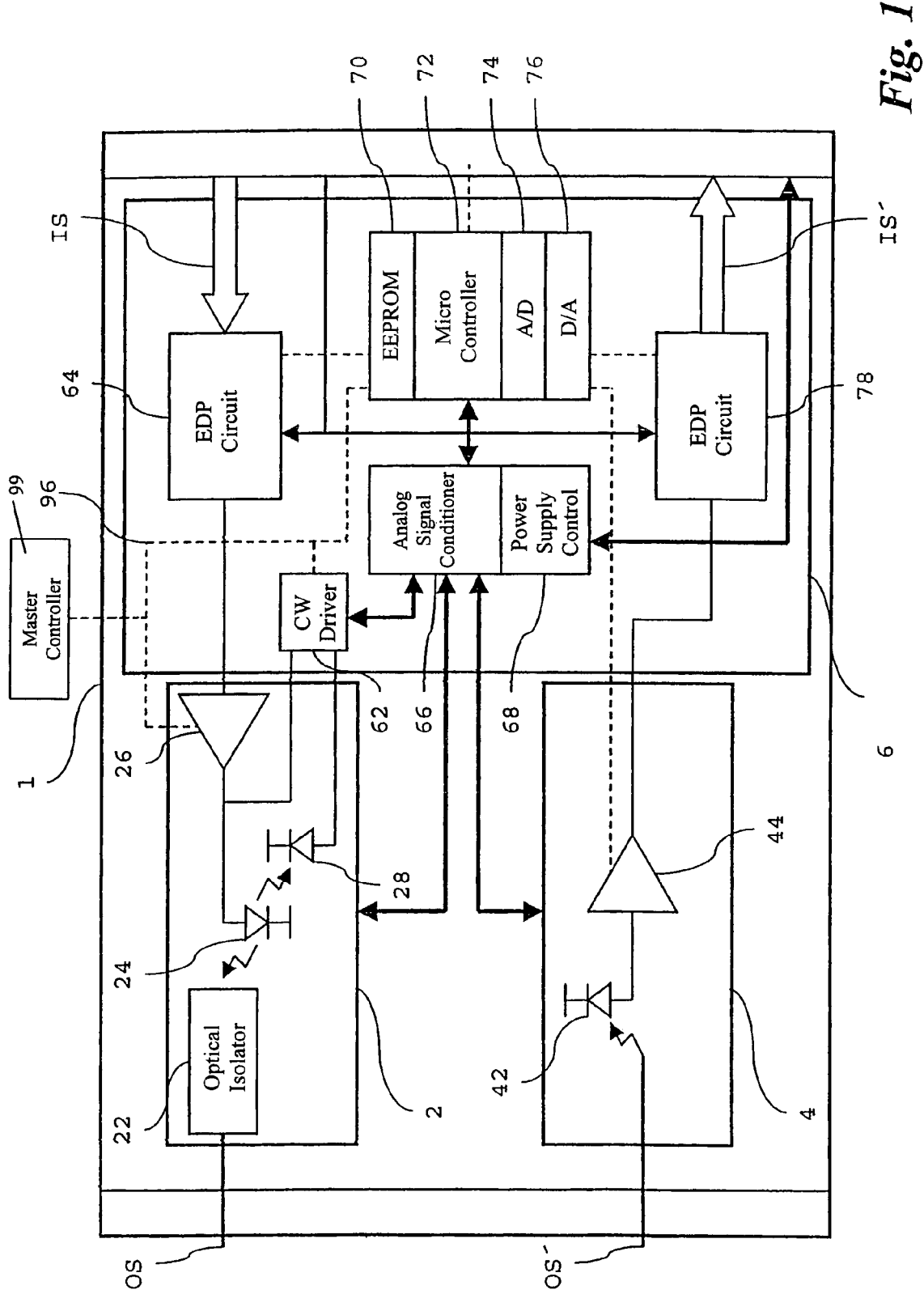

In the drawing, an electro-optical transceiver 1 is shown essentially composed of three basic building blocks, namely:
 a transmitter optical sub-assembly (TOSA) 2,
 a receiver optical sub-assembly (ROSA) 4, and
 an electrical sub-assembly (ESA) 6.

Operation of the transmitter portion of the transceiver 1 provides for a digital input signal IS from an electrical connector (such as e.g. a digital 10 Gbit/s bitstream) being fed to an electronic data processing (EDP) circuit 64 in the sub-assembly 6. In an XFP transceiver of the type considered herein, the circuit 64 typically takes a generally corrupted analog IS signal and restores it to a CML logical signal, which is then passed on to a RF-driver 26 and a laser 24. Specifically, the laser driver converts the signal received from the circuit 64 into an analog signal suitable to be converted by the laser 24 into a proper optical signal. The optical radiation OS generated by the laser 24 is passed through an optical isolator 22.

Operation of the receiver portion of the transceiver 1 provides for a received optical signal OS' being fed to an opto-electrical converter (such as a PIN-diode 42) and a trans-impedance amplifier (TIA) 44. The analog output signal from the amplifier 44 is fed to an electronic data processing (EDP) circuit 78. The circuit 78 converts the analog signal to a digital output signal IS' (such as e.g. a digital 10 Gbit/s bitstream)

The general system layout described in the foregoing corresponds to the typical layout of an opto-electrical transceiver according to well-known technology, thus rendering it unnecessary to provide a more detailed description herein.

The transceiver 1 is adapted to self-adjust its operation parameters in conformity with a plurality of standards. Specifically, in a presently preferred embodiment, the transceiver is configured in order to permit any of the following parameters to be selectively adjusted:

the output power from the transmitter 2,
the extinction ratio of the transmitter 2,
the bit rate of the transmitter 2, and
the bit rate (i.e. the bandwidth) of the receiver 4.

The transceiver 1 incorporates an optical monitor device (such as e.g. a monitor PIN-diode 28) and a continuous wave (CW) driver 62 for setting the bias current in the laser source 24.

The PIN-diode 28 collects the back facet power from the laser 24 and the signal resulting form opto-electrical conversion is fed back to the CW driver 62.

The arrangement described implements a closed loop (i.e. a feedback loop) adapted to maintain at a constant level the optical power output from the laser 24. Typically, this is done by comparing the power value read via the photodiode 28 with an internal reference and by acting on the CW driver 62 in order to modify the bias current so that the (average) output power from the laser 24 is kept constant.

The power output level set by the control loop just described may thus be selectively varied by selectively modifying the internal reference value against which the power value read via the photodiode 28 is compared.

The CW driver 62 also provides a control signal to the RF driver 26 in order to set a proper value of the modulation current, such that the wanted extinction ratio is achieved. Alternatively, adjustment/variation of the extinction ratio can be achieved by keeping the modulation constant and varying (e.g. decreasing) the laser bias.

The CW driver 62 is wired through a digital bus 96 to a micro-controller 72.

Associated with the micro-controller 72 is a memory (such as an EEPROM 70) an analog-to-digital converter (A/D) 74 and, typically, a digital-to-analog (D/A) converter 76.

Finally, reference number 66 designates an analog signal conditioner with an associated power supply control 68.

The conditioner 66 is adapted to co-operate with the micro-controller 72 in order to permit the micro-controller 72 to "sense" the power and the bias current of the laser 24 continuously.

The micro-controller 72 can be programmed (e.g. by means of a program stored in the EEPROM 70) in order to change the reference value for the average power in the CW driver 62 and thus selectively vary the transmitter output power accordingly.

The micro-controller also controls the CW driver 62 to change the modulation current in order to selectively achieve a certain extinction ratio.

The digital bus 96 also connects the micro-controller 72 to the circuits 64 and 78. As indicated, these are essentially circuits configured for performing processing tasks such as clock recovery, equalization, muxing and demuxing, error detection and correction.

Typically, the clock recovery function is performed by means of PLL circuitry adapted to "lock" on a certain incoming signal and exchange corresponding information with the micro-controller 72. In that way, operation of the transmitter 2 and/or the receiver 4 can adapt to any specified bit rate (i.e. bandwidth).

Advantageously, the micro-controller 72 is also connected through the digital bus 96 to a master controller 99 on the host board e.g. to transmit values for the various operation parameters as measured and receive specific instructions, these instructions possibly including control signals indicating that one or more operating parameters (e.g. the extinction ratio of the laser source 24) must be changed. Those of skill in the art will promptly appreciate that while the design of the digital bus 96 may be unique for communication with internal and external devices, this is no may a mandatory requirement (and is not the case for the XFP transceiver considered herein).

By resorting to the arrangement just described, the behavior of the transceiver 1 can be selectively adapted/customized "on the fly".

To that purpose the micro-controller 72 may receive from the host board information regarding the basic operating parameters (such as e.g. the bit rate, the extinction ratio, etc. as set by a given standard) adopted in the system, which includes the transceiver 1.

Based on these instructions, the micro-controller 72 implements corresponding adjustments. These may include e.g. controlling the CW driver 62 in order to adjust the bias and the modulation current of the laser 24 in order to achieve a desired optical power level and extinction ratio in the transmitter 2. Additionally or alternatively, the micro-controller 72 can control the circuits 64 and 78 e.g. in order to impose a given bit rate or other parameters (such as e.g. jitter, equalization, coding, etc.) for the transmitter 2 and the receiver 4.

Other adjustments possibly required do not necessarily need to be positively imposed by the micro-controller 72: exemplary of these are e.g. locking the receiver section 3 on a new, different bit rate of the incoming signal OS'.

In that case, the micro-controller 72 is "informed" of the corresponding adjustment as carried out automatically, e.g. by the PLL in the circuit 78, so that the microcontroller may in turn impose other, related adjustments such as e.g. adapt the bit rate of the outgoing signal OS to the new bit rate of the incoming signal OS'.

It is thus evident that, the basic principles of the invention remaining the same, details and embodiments may widely vary with respect to what has been described and illustrated purely by way of example, without departing from the scope of the presented invention as defined in the annexed claims. Also, terms such as "optical", "light", "photosensitive", and that like are evidently used herein with the meaning currently allotted to those terms in fiber and integrated optics, being thus intended to apply to radiation including, in addition to visible light, e.g. also infrared and ultraviolet radiation.

What is claimed is:

1. A Small Form Factor Pluggable (XFP) electro-optical transceiver comprising a pluggable module having a module housing, an electrical interface, and an optical interface, the pluggable module comprising within the module housing:

a transmitter module including an electro-optical source for converting an electrical input signal received via the electrical interface into an optical output signal;

a receiver module including an opto-electrical detector for converting an optical input signal received via the optical interface into an electrical output signal;

a sensor associated with said receiver module for sensing a bit rate of said optical input signal;

an adaptation unit associated with said transmitter module for varying an operating power parameter of said transmitter module;

a processing unit in communication with said receiver module and said transmitter module for determining said operating power parameter of said transmitter module based on said bit rate, and for controlling operation of said adaptation unit in order to adapt operation of said transmitter module in accordance with said operating power parameter, wherein the processing unit is selectively configured to determine said operating power parameter based on a control signal received from a master controller via a digital bus.

2. The XFP electro-optical transceiver of claim 1, wherein said adaptation unit is selected from the group consisting of: a current adaptation unit, a power adaptation unit, a extinction ratio adaptation unit, and a bit rate adaptation unit.

3. The XFP electro-optical transceiver of claim 1, wherein said electro-optical source is a laser, and said adaptation unit is selected from the group consisting of:

a bias current adaptation unit that varies a bias current of said laser, and a modulation current adaptation unit that changes a modulation current of said laser.

4. The XFP electro-optical transceiver of claim 1, wherein said electro-optical source is a laser and said adaptation unit changes an extinction ratio of said transmitter module by changing a characteristic selected from the group consisting of a modulation current of said laser and a bias of said laser.

5. The XFP electro-optical transceiver of claim 1, wherein said processing unit is a micro-controller.

6. The XFP electro-optical transceiver of claim 1, wherein said processing unit has an associated master controller and is configured for performing an operation selected from the group consisting of:

sending values of parameters measured in the XFP electro-optical transceiver to said master controller, and receiving from said master controller, instructions for setting operating parameters of said XFP electro-optical transceiver.

7. The XFP electro-optical transceiver of claim 1, wherein said adaptation unit and said processing unit are associated with said transmitter module and said receiver module as an on-board adaptation system.

8. A Small Form Factor Pluggable (XFP) electro-optical transceiver comprising a pluggable module having a module housing, an electrical interface, and an optical interface:

a transmitter module including an electro-optical source for converting an electrical input signal received via the electrical internal into an optical output signal;

a receiver module including an opto-electrical detector for converting an optical input signal received via the optical interface into an electrical output signal;

a sensor associated with the receiver module for sensing a receive bit rate of said optical input signal;

an adaptation unit associated with said transmitter module for varying a transmit bit rate and an optical power output of said optical output signal; and a processing unit in communication with the transmitter module and the receiver module for determining said transmit bit rate and said optical power output of said optical output signal based on said receive bit rate, and for controlling operation of said adaptation unit in order to adapt operation of said transmitter module in accordance with said transmit bit rate and said optical power output, wherein the processing unit is selectively configured to determine at least one of said receive bit rate, said transmit bit rate, and said optical power output based on a control signal received from a master controller via a digital bus.

* * * * *